Figure 1:
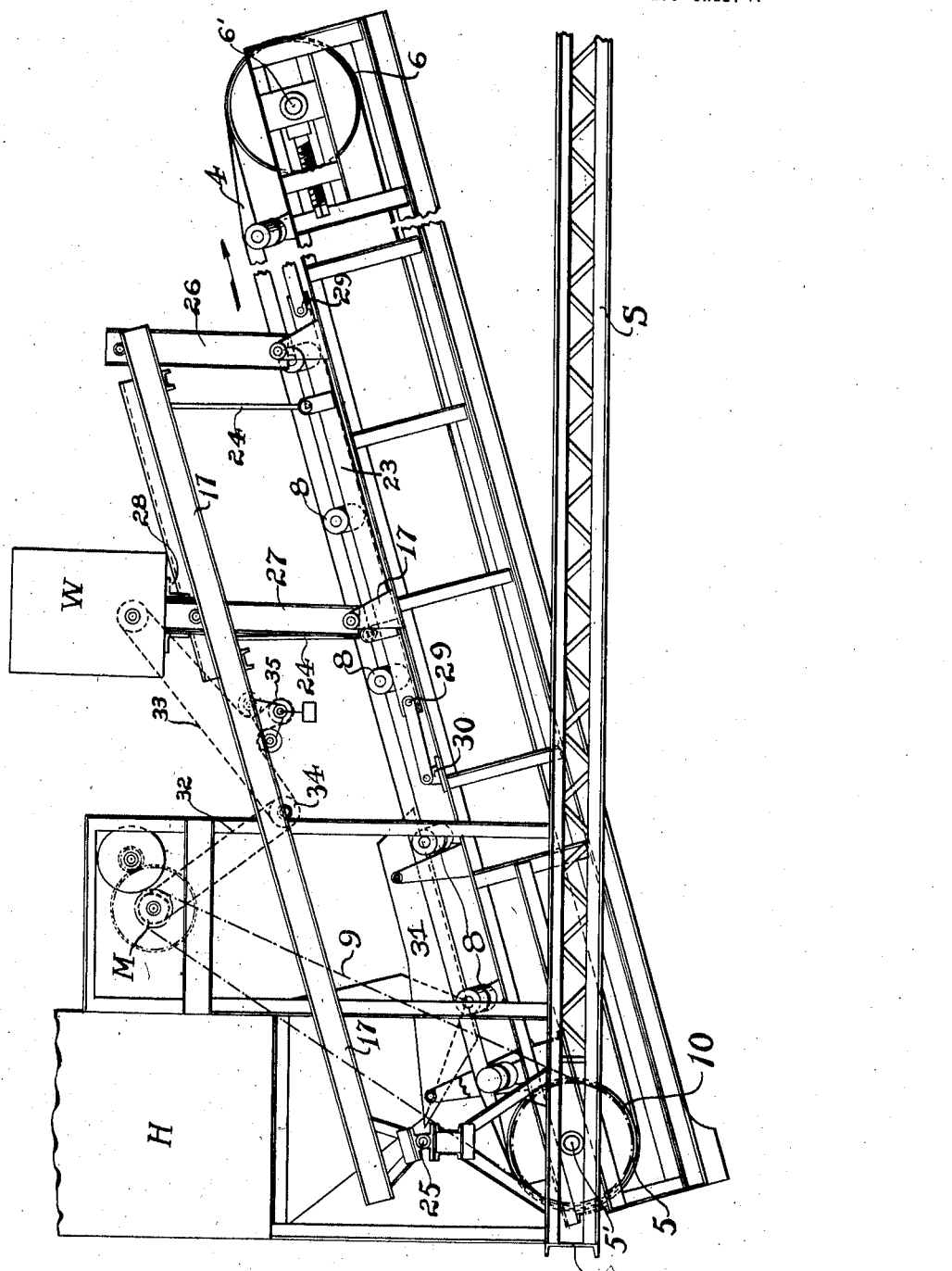

UNITED STATES PATENT OFFICE.

HERBERT L. MERRICK, OF PASSAIC, NEW JERSEY, ASSIGNOR TO MERRICK SCALE MFG. CO., OF PASSAIC, NEW JERSEY, A CORPORATION OF NEW JERSEY.

CONTINUOUS-WEIGHING APPARATUS.

1,186,218.  Specification of Letters Patent.  Patented June 6, 1916.

Application filed November 24, 1913. Serial No. 802,597.

*To all whom it may concern:*

Be it known that I, HERBERT L. MERRICK, a citizen of the United States, residing in Passaic, in the county of Passaic and State of New Jersey, have invented new and useful Improvements in Continuous-Weighing Apparatus, of which the following is a specification.

This invention relates to weighing mechanism for continuously weighing material as it is carried by a mechanical conveyer, either of a belt, bucket or other type, in which a portion of the conveyer is suspended from weighing levers connected with a scale beam having an automatic balancing device, such as a spring, or a plunger immersed in mercury, attached thereto. In this method of weighing an integrating device integrates and totalizes the product of the load carried by the conveyer and the travel of the conveyer, so that the result is the weight of material carried by the conveyer.

It is the present practice to rigidly support the weighing and integrating mechanism from the foundation of the conveyer structure itself, or from the longitudinal members on which the conveyer is placed. This construction is not objectionable when the conveyer is stationary and it is not necessary to alter the inclination or plane of travel of the conveyer. However, it is very often necessary to change the inclination or direction of travel of the conveyer so that the discharge end will be at a certain height, as for instance, when loading material into ships. The present method of constructing and supporting the weighing mechanism does not permit of appreciably varying the inclination or direction of travel of the conveyer without interfering with the correct and efficient operation of the weighing mechanism.

It is the object of the present invention to overcome the above disadvantages and so construct and support the weighing mechanism that any changes in the direction of travel of the conveyer will not affect the correct and efficient operation of the weighing mechanism, the weighing mechanism being simultaneously and automatically adjusted with the conveyer to any change in inclination thereof, so that the relation between the two will be the same at all times.

In carrying out the invention I provide a pair of beams extending longitudinally of and above the conveyer support, the ends of said beams adjacent to the fixed ends of the conveyer support being mounted to swing on an axis which is in the same vertical plane as the axis of rotation of the pulley at the loading end of the conveyer. The opposite ends of said members are connected to the conveyer support by pivoted standards or struts maintaining them and the conveyer always parallel. The main weighing levers of the weighing mechanism are supported upon these members so that the plane of the pivots of said levers always remains parallel and equidistant from the conveyer and also the suspended and fixed portions of the conveyer remain always in the same relation to each other, with the rods suspending a portion of the conveyer from the weighing levers always in a vertical position. A second pair of pivoted standards are connected to said members and the conveyer support, said latter standards supporting the weighing beam, the automatic balancing device and the integrating or registering device.

Figure 2:
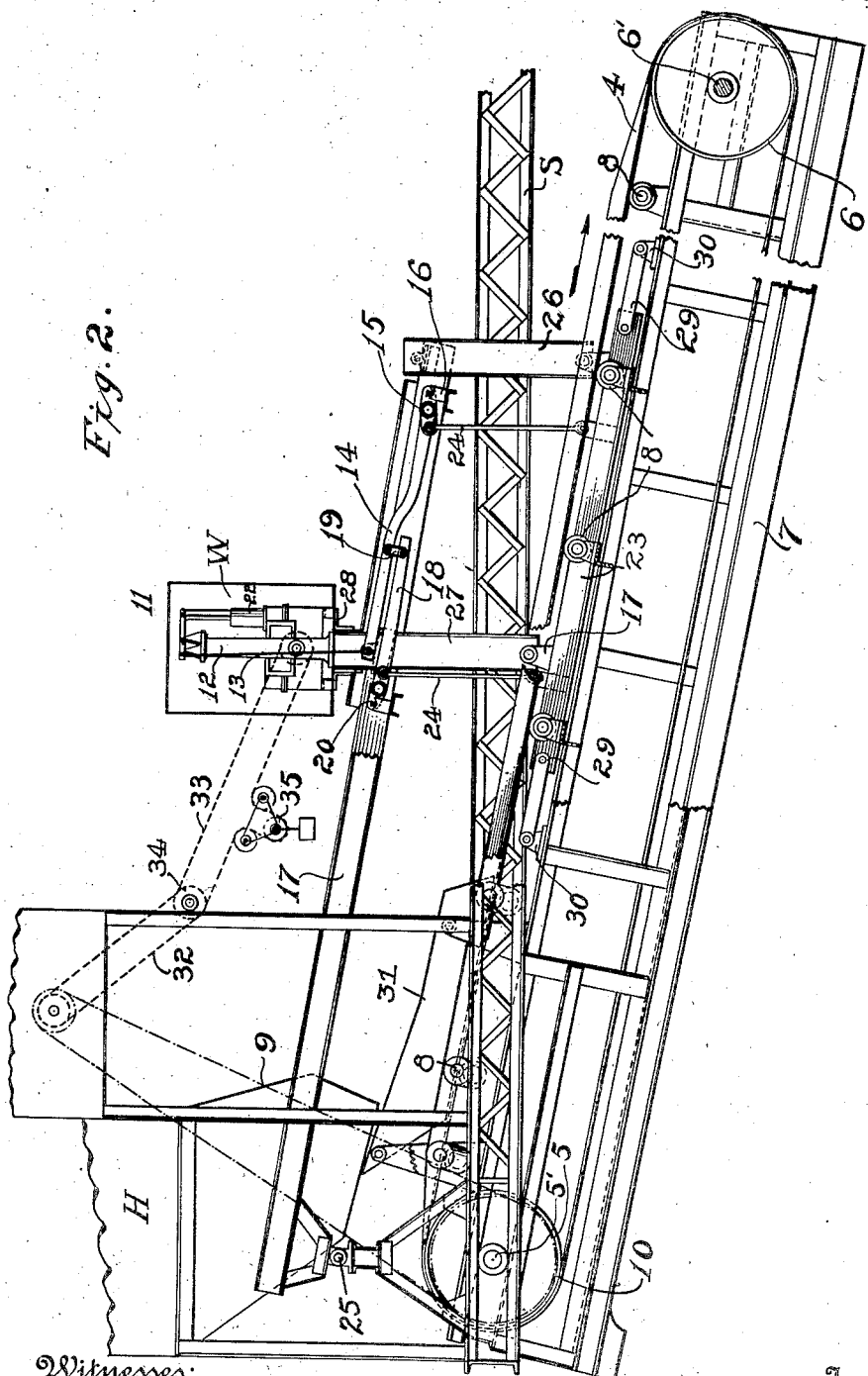
Figure 3:
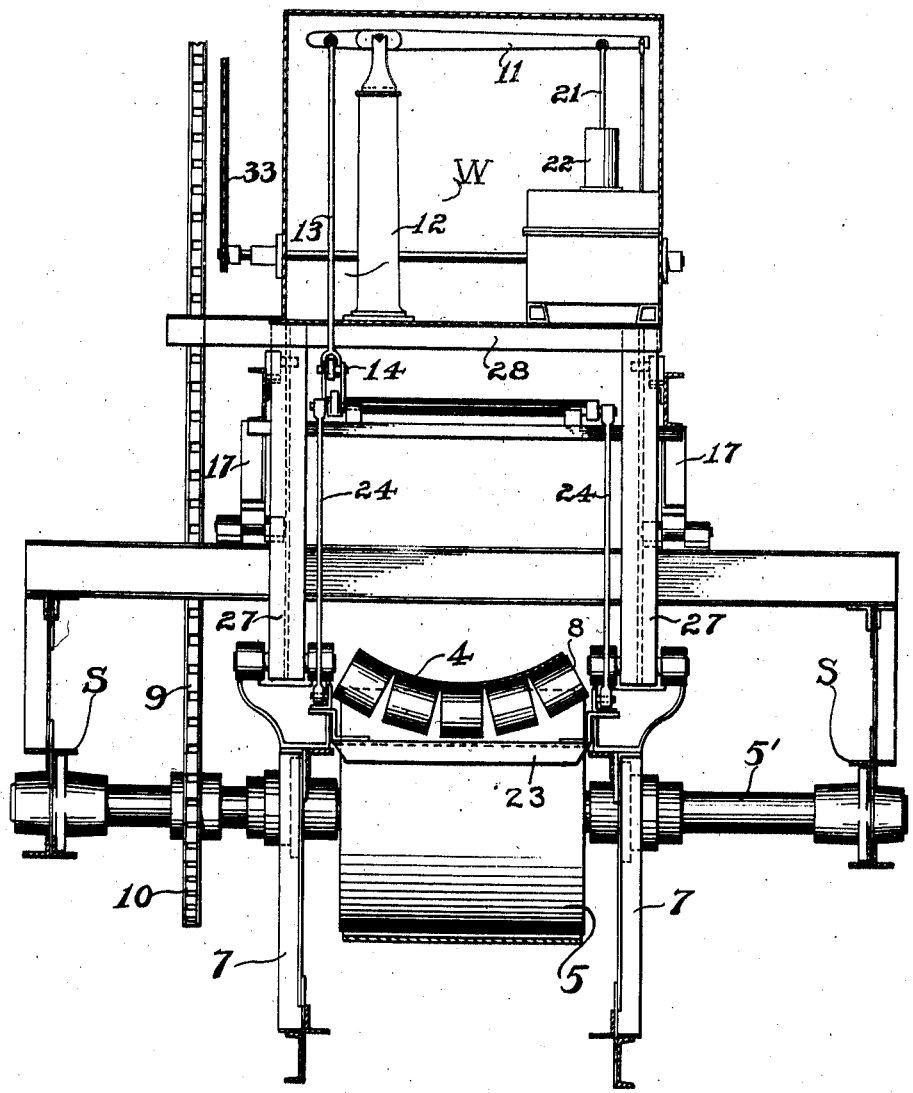

In the drawings accompanying and forming a part of this specification, Figure 1 is a side elevation of a belt conveyer and weighing mechanism connected thereto illustrating an embodiment of my invention. Fig. 2 is a similar view to illustrate the conveyer adjusted to travel in a plane inclined downwardly to the horizontal; and Fig. 3 is an end elevation looking at the left of Figs. 1 and 2.

Similar characters of reference designate like parts throughout the different views of the drawings.

In the drawings I have illustrated an embodiment of my invention in connection with a belt conveyer 4 passing around pulleys 5, 6 fixed to shafts 5', 6' with the upper stretch of the belt supported on troughing rollers 8. The shafts 5', 6' are journaled in a pair of longitudinal members 7, 7 extending outward from a fixed part of the conveyer structure, and which is in the nature of a boom, the shaft 5' also rotatably supports the member 7 upon a fixed part of the conveyer support (designated in a general way by S). The belt is actuated by a suitable motor (designated in a general way by M) and a sprocket chain or the like 9 passing over a wheel 10 fixed to the shaft 5' of the pulley 5. It will be noted that the shaft 5' also serves as an axis to swing the outer end of the conveyer supporting members or stringers 7 upward or downward.

The weighing mechanism (designated in a general way by W) consists of a scale beam 11 pivotally supported by knife edge bearings on a column 12, the short end of said beam being pivotally connected by a link 13 to one end of a weighing lever 14. The other end of said lever is fixed to a transverse bar 15 fulcrumed, as at 16, on blocks secured to a pair of beams 17, 17, extending parallel with and above the conveyer support 7, the purpose of which will be hereinafter described. The other weighing lever 18 is connected to lever 14, as at 19, with the other end fixed to a transverse bar fulcrumed, as at 20, on bearing blocks also secured to the members 17. As is well known in this type of weighing mechanism a portion of the conveyer is carried by idler troughing rollers 8, mounted on a platform 23 connected to and suspended from the weighing levers 14, 18 by links 24. One end of the scale beam 11 is provided with a suitable automatic balancing device, in the present instance shown as consisting of a plunger connected by a link 21 to the scale beam and hanging in a receptacle 22 containing mercury whereby any weight on the levers 14, 18 is automatically balanced, the increase or decrease of load on said levers raising or lowering the plunger in the mercury until the loss or gain in buoyancy compensates for the variation in the load. The extreme end of the scale beam is connected to an integrator which derives its other factor from the travel of the conveyer from any suitable means, in the present instance shown as driven from the motor M through belts or chains 32, 33 and sprocket wheels 34, any slack in the chain 33 being taken up by a floating idler 35. This integrator continuously totalizes the product of two quantities, one proportional to the weight of the load on the weighing levers and the other to the travel of the material, but as this does not constitute an essential feature of the invention a detail description is not deemed necessary.

In this type of weighing mechanism it is necessary that the relative positions of the weighing levers and the suspended part of the conveyer are not disturbed, that the links or rods connecting the suspended portion of the conveyer with the weighing levers are always in a vertical position and the pivotal axis of the scale beam at all times in a horizontal plane, as should there be any change in the direction of travel or inclination of the conveyer relative to the pivots of the weighing levers it would be impossible to correctly and efficiently weigh the material carried by the conveyer. To permit of the adjustment of the conveyer support and the conveyer, means are therefore provided to simultaneously and automatically adjust the weighing mechanism with any adjustment of the conveyer support and the conveyer, so that the weighing mechanism coincides with any change in the direction of travel of the conveyer. For this purpose I provide the members 17 which support the pivot blocks of the weighing levers, said members being pivotally supported, as at 25, at their ends adjacent to the fixed end of the conveyer support and in the same vertical line as the axis of rotation of the pulley 5. The opposite ends of the members 17 are pivotally connected to the conveyer support by a pair of struts or standards 26 maintaining said members and the conveyer always parallel. Another part of struts or standards 27 are pivotally connected to said members and the conveyer support, these latter standards being connected by a cross-piece 28 on which the weighing beam, automatic balancing device and the registering or integrating device are supported. The center line of these standards 27 corresponds with the center line of the rod or link connecting the scale beam with the weighing levers, thereby maintaining the fulcrum on which the scale beam is carried in a horizontal plane, and the distances between this fulcrum, the end of the weighing lever, and the balancing device to which one end of the scale beam is connected are always the same no matter to what position the conveyer may be adjusted either above or below its horizontal position. As a consequence of the foregoing the same amount of weight on the suspended portion of the conveyer will cause the beam to move a constant amount at all positions of the conveyer, as the rods suspending a portion of the conveyer from the weighing levers, and the rods connecting the levers to the scale beam, as well as the rod connecting the scale beam to the automatic balancing device, and also the rod connecting the scale beam to the integrating and recording apparatus, always remain in a vertical position, thereby assuring the correct and efficient weighing of the load on the conveyer no matter what angle the travel of the conveyer may assume.

In the present instance the conveyer travels in the direction indicated by the arrow, and any strains of the conveyer or load thereon on the conveyer supporting platform of the scale mechanism in the direction of travel of the conveyer is taken up by links 29 pivotally connected at one end to said platform and the other ends pivotally connected to brackets 30 fixed upon the conveyer support. The material is fed onto the conveyer from a hopper (designated in a general way by H) to a chute 31 fixed to and movable with the conveyer support with relation to the outlet of the hopper. It will be understood that any suitable means may be provided to elevate and lower the free end of the conveyer support and maintain it in its adjusted position.

Variations may be resorted to within the scope of my invention.

Having thus described my invention, I claim:

1. The combination with a traveling conveyer supported to have adjustment in a vertical plane, of weighing mechanism to weigh a load transported by said conveyer, said weighing mechanism connected to and adjustable with the conveyer support so that any alteration in the direction of travel of the conveyer will not disturb any of the functions of the weighing mechanism.

2. The combination with a traveling conveyer adjustable in a vertical plane, of weighing mechanism to weigh a load transported by said conveyer, and means to connect and support the weighing mechanism by the conveyer to adjust the weighing mechanism simultaneously with any adjustment in the direction of travel of the conveyer without disturbing any function of the weighing mechanism.

3. In weighing mechanism for traveling conveyers, the combination of an adjustable support for the conveyer to change the direction of travel thereof; weighing mechanism having means to support a portion of the conveyer; and means to adjust the scale mechanism simultaneously with any adjustment of the conveyer and maintain the conveyer supporting means of the weighing mechanism at all times in a plane parallel to the direction of travel of the conveyer.

4. In weighing mechanism for traveling conveyers, the combination with the conveyer, of means to adjustably support the conveyer to change the direction of travel thereof; weighing mechanism having means connected thereto to carry a portion of the conveyer, and means to connect the weighing mechanism to the conveyer support, to effect adjustment of the weighing mechanism simultaneously with any adjustment of the conveyer and maintain the conveyer carrying means of the weighing mechanism in a plane parallel to the direction of travel of the conveyer, and the means to connect the conveyer carrying means of the weighing mechanism to the latter at a constant angle with a vertical line for different planes of travel of the conveyer.

5. In weighing mechanism for traveling conveyers, the combination with the conveyer, of weighing mechanism having means to support a portion of the conveyer; and an adjustable support for the conveyer and weighing mechanism, to maintain the conveyer-supporting means of the weighing mechanism at all times in a plane parallel to the direction of travel of the conveyer.

6. In weighing mechanism for traveling conveyers, the combination with the conveyer, of means to adjustably support the same; scale mechanism having weighing levers; means connected to the weighing levers to support a portion of the conveyer; and means to support the scale mechanism by the conveyer support to maintain and simultaneously effect adjustment of the conveyer-supporting means of the scale mechanism with any adjustment in the conveyer and maintain it in a plane parallel to the direction of travel of the conveyer.

7. In weighing mechanism for traveling conveyers, the combination with the conveyer, of an adjustable support therefor; weighing mechanism having weighing levers and means connected thereto to support a portion of the conveyer; and a support for the weighing mechanism connected to the conveyer support to simultaneously adjust the weighing mechanism with any adjustment of the conveyer and maintain the weighing levers and conveyer-supporting means of the weighing mechanism at all times parallel to the direction of travel of the conveyer.

8. In weighing mechanism for traveling conveyers, the combination with the conveyer, of weighing mechanism having weighing levers and a scale beam connected to said levers; means connected to the levers to support a portion of the conveyer; an adjustable support for the conveyer; and means to support the weighing mechanism by said support to simultaneously effect adjustment of the weighing levers and conveyer-supporting means of the weighing mechanism with any adjustment of the conveyer support to maintain the levers and conveyer-supporting means of the weighing mechanism at all times in a plane parallel with the direction of travel of the conveyer, and the scale beam in position to swing on a horizontal axis.

9. In weighing mechanism for traveling conveyers, the combination with the conveyer, of weighing mechanism having a pivoted scale beam, weighing levers connected to said scale beam supporting a portion of the conveyer; and an adjustable support for the conveyer and weighing mechanism, so that any alteration in the plane of travel of the conveyer will not disturb any function of the weighing mechanism.

10. In weighing mechanism for traveling conveyers, the combination with the conveyer, of weighing mechanism having a pivoted scale beam; means connected to said scale beam to support a portion of the conveyer; and an adjustable support for the conveyer and weighing mechanism to simultaneously effect adjustment of the conveyer and the means to support a portion of the conveyer from the scale beam and maintain the latter at all times in a plane parallel with the direction of travel of the conveyer, and the pivotal axis of the scale beam in a horizontal position.

11. In weighing mechanism for traveling conveyers, the combination with the conveyer, of weighing mechanism having a pivoted scale beam; means connected to said scale beam to support a portion of the conveyer; an adjustable support for the conveyer and weighing mechanism; means to simultaneously effect adjustment of the conveyer and the means to support a portion of the conveyer from the scale beam and maintain the latter at all times in a plane parallel with the direction of travel of the conveyer and the pivotal axis of the scale beam in a horizontal position; and means connected to the scale beam and conveyer to record the weight of the material transported by the conveyer.

12. In weighing mechanism for traveling conveyers, the combination with the conveyer, of a carrier for said conveyer pivotally supported at one end to swing one end of the carrier in a vertical direction to change the direction of travel of the conveyer; weighing mechanism having means to support a portion of the conveyer; and a carrier for the weighing mechanism extending parallel with the conveyer carrier and pivotally supported at one end and connected at the other end to the conveyer carrier whereby as the latter is swung upward or downward the carrier for the weighing mechanism will be simultaneously swung in the same direction and to the same extent, and the conveyer-carrying means of the weighing mechanism is at all times maintained in a plane parallel with the direction of travel of the conveyer.

13. The combination with a traveling conveyer and weighing mechanism to weigh a load transported by said conveyer, of adjustable supporting means for the conveyer and weighing mechanism to change the direction of travel of the conveyer and simultaneously adjust the weighing mechanism to adapt it to any change in the direction of travel of the conveyer, substantially as and for the purpose specified.

14. The combination with a traveling conveyer and weighing mechanism to weigh a load transported by said conveyer, of means to support the conveyer and weighing mechanism; and means to adjust said support to alter the plane of travel of the conveyer and simultaneously adjust the weighing mechanism to any change in the direction of travel of the conveyer, substantially as and for the purpose specified.

15. The combination with a traveling conveyer, of weighing mechanism comprising a scale beam having automatic balancing means connected thereto and weighing levers connected to said scale beam having means to support a portion of the conveyer; an adjustable support for the conveyer; and an adjustable support for the weighing mechanism connected to the conveyer support to simultaneously adjust the weighing mechanism when the conveyer support is adjusted to maintain the fulcrum of the weighing levers parallel with and equidistant from the conveyer and the fulcrum of the scale beam in a horizontal position, substantially as and for the purpose specified.

16. The combination with a traveling conveyer, of weighing mechanism comprising a scale beam having automatic balancing means connected thereto and weighing levers connected to said scale beam having means to support a portion of the conveyer; an adjustable support for the conveyer to alter the direction of travel thereof; and an adjustable support for the weighing mechanism connected to the conveyer support to simultaneously adjust the weighing mechanism when the conveyer support is adjusted to maintain the fulcrums of the weighing levers parallel with and equidistant from the conveyer and the fulcrum of the scale beam in a horizontal position, comprising a pair of parallel beams extending longitudinally of and above the conveyer support with one end pivotally supported in the same vertical line as the pivot of the conveyer support, a pair of standards pivotally connecting the free ends of said beams with the conveyer support, a second pair of standards pivotally connected to said beams and the conveyer support, and a cross-piece connecting said latter standards and supporting the scale beam and automatic balancing device.

HERBERT L. MERRICK.

Witnesses:
MORGAN G. SHARPE,
EMILE C. BOERNER, Jr.